United States Patent [19]
Zeichner

[11] Patent Number: 5,376,062
[45] Date of Patent: Dec. 27, 1994

[54] ROBOTIC MANUFACTURING UNIT

[76] Inventor: Eliezer Zeichner, 13 Maaleh Hatzofim Street, Ramat Gan, Israel

[21] Appl. No.: 57,257

[22] Filed: May 4, 1993

[30] Foreign Application Priority Data

May 15, 1992 [IL] Israel ................................. 101877

[51] Int. Cl.5 ............................................. B23Q 3/155
[52] U.S. Cl. ........................................ 483/55; 483/56; 483/901; 901/41
[58] Field of Search ..................... 483/54, 55, 56, 57, 483/30, 901, 902; 414/751; 901/41, 39

[56] References Cited

U.S. PATENT DOCUMENTS

| | | |
|---|---|---|
| 4,306,350 | 12/1981 | Kearney . |
| 4,358,888 | 11/1982 | Zankl ................................. 483/54 |
| 4,520,550 | 6/1985 | Dunn et al. ........................ 483/55 |
| 4,644,635 | 2/1987 | Murai et al. ...................... 483/54 |
| 4,648,171 | 3/1987 | Yasukawa ...................... 483/54 X |
| 4,656,727 | 4/1987 | Itoh ................................. 483/55 |
| 4,725,193 | 2/1988 | Sticht ............................. 414/751 |
| 4,761,877 | 8/1988 | Rupp .............................. 483/54 |

FOREIGN PATENT DOCUMENTS

| | | |
|---|---|---|
| 12553 | 6/1980 | European Pat. Off. . |
| 3022717 | 1/1982 | Germany . |
| 3206833 | 2/1982 | Germany . |
| 3331293 | 3/1984 | Germany . |
| 263725 | 1/1989 | Germany ......................... 483/54 |
| 63992 | 1/1981 | Israel . |
| 144926 | 6/1988 | Japan ............................ 483/56 |
| 772800 | 12/1978 | U.S.S.R. . |
| 8202848 | 9/1982 | WIPO ............................. 483/55 |

*Primary Examiner*—William Briggs
*Attorney, Agent, or Firm*—Schweitzer Cornman & Gross

[57] ABSTRACT

A robotic manufacturing unit with automatic tool changer, including a stand defining a working space and accommodating a working surface, an output member adapted to controllably move in three-dimensional space supported above the stand, a tool-holding and changing member attached to the output member and adapted to clampingly retain shanks of carriers of tools, a tool tray adapted to accommodate a plurality of tools mounted on tool carriers and, in coordination with the tool holding and changing member, to move from a position of rest, in which the tray is located outside of the working space, to a position of tool pickup and return, in which the tray is substantially located within the working space. The tool-holding and changing member and the shanks fit into one another and have non-circular cross-sections uniquely and reproducibly defining, when the shanks are clampingly retained, the relative angular positions of the tool-holding and changing member and the shanks.

5 Claims, 6 Drawing Sheets

ROBOTIC MANUFACTURING UNIT

The present invention relates to a robotic manufacturing unit with automatic tool changer.

Existing tool changing systems either use a tool magazine mechanism that presents the tools in a defined, single pickup position to be picked up by an intermediary such as a separate tool transferring arm, which conveys the tool to, e.g., the machine spindle or the tool holder, or a stationary arrangement of tools on the robot main tool plate, to be picked up by the robot end-of-arm, sacrificing usable work area.

It is one of the objects of the present invention to overcome the drawbacks and disadvantages of the known tool-changing systems and to provide a system that requires no intermediary between tool magazine and tool holder and wastes no working area for tool storage, and that ensures a high degree of positional constancy and reproducibility without excessive demands for dimensional and geometrical precision of the matching portions of tool holder and tool shank.

According to the invention, this is achieved by providing a robotic manufacturing unit with automatic tool changer, comprising a stand defining a working space and accommodating a rigid, substantially plane working surface; means, supported by said stand above said working surface, and having an output member adapted to controllably move in space; a tool-holding and changing member attached to said output member and adapted to clampingly retain shanks of carriers of tools; a tool tray adapted to accommodate a plurality of tools mounted on tool carriers and, in coordination with said tool holding and changing member, to move along guide means from a position of rest, in which said tray is located outside of said working space, to a position of tool pickup and return, in which said tray is substantially located within said working space and above said working surface, wherein said tool-holding and changing member and said shanks fit into one another and have non-circular cross-sections uniquely defining, when said shanks are clampingly retained, the relative positions of said tool-holding and changing member and said shanks.

The invention will now be described in connection with certain preferred embodiments, with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
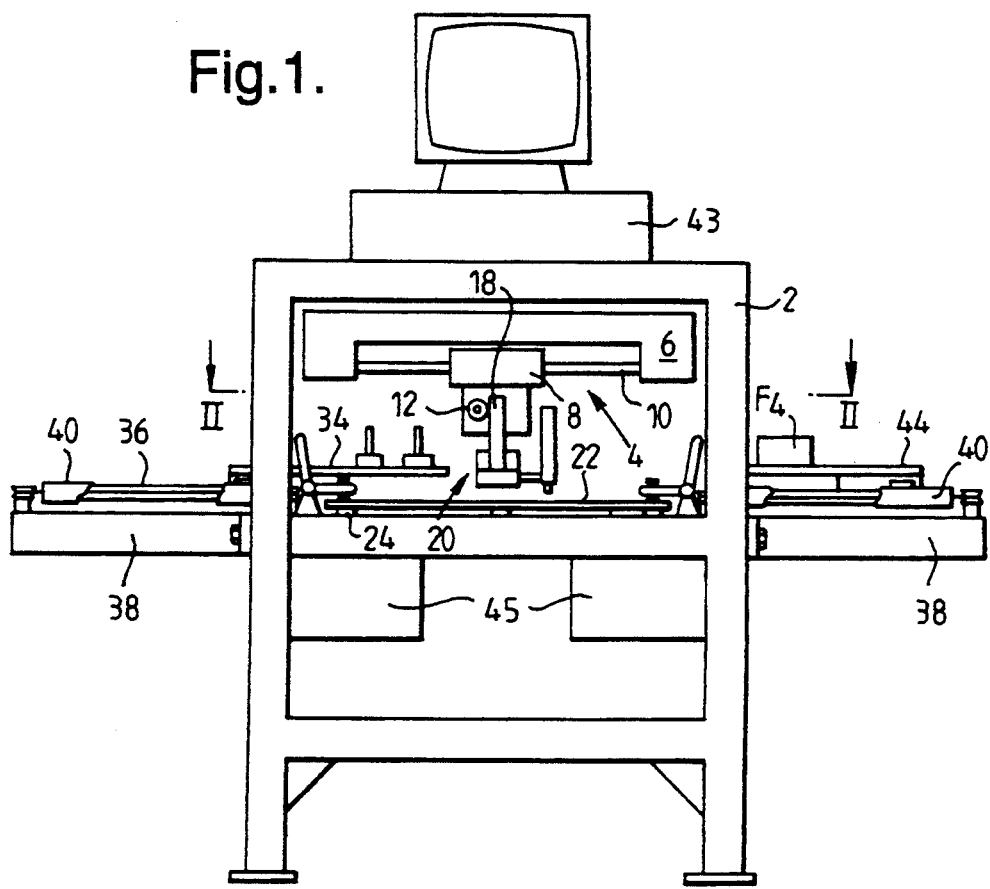
FIG. 1 is a schematic front view of the unit according to the invention.
Figure 2:
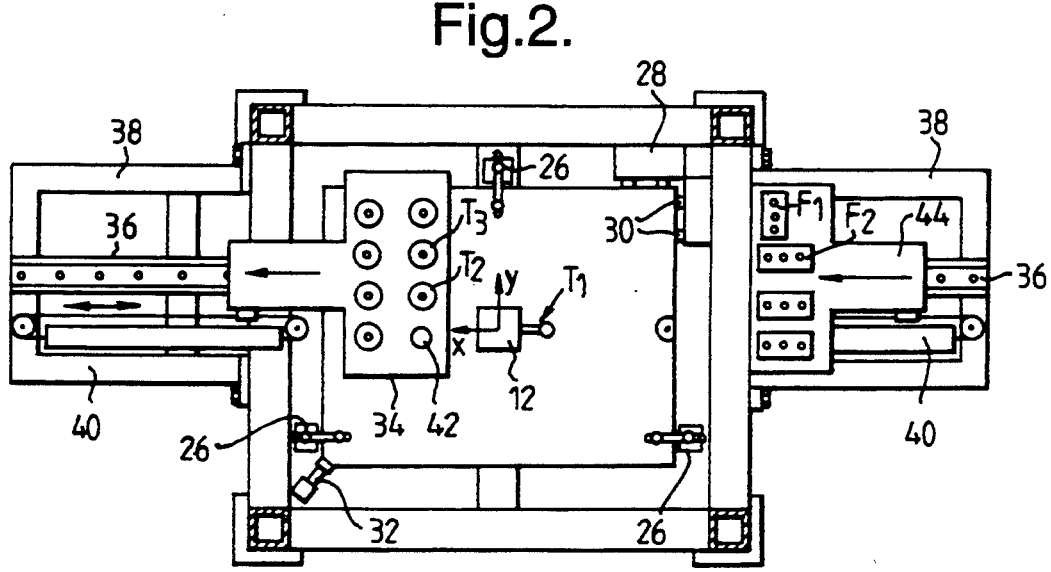
FIG. 2 is a top view of the unit of FIG. 1.

Referring now to the drawings, there is seen in FIGS. 1 and 2 a main frame 2, a closed structure for rigidity. Attached to the upper part of the frame 2 is a computer-controlled, commercially available XY-positioner 4 comprising a base 6 and an X-slide 8 moving along guide rods 10 which, in turn, guidedly move along the Y-axis. To this has been added a computer-controlled stepping motor 12 (or a servo motor with shaft encoder), fixedly attached to the X-slide 8, which drives a pinion 14 meshing with a rack 16 (see FIG. 3) attached to a block 17 slidably mounted on a guide rail 19 fixedly attached to the housing of the stepping motor 12. To this block 17 is attached a cantilever arm 18 carrying the tool holder and changer head 20. This arm, with the aid of the above-described rack-and-pinion drive, performs the movement along the Z-axis, in addition to the XY motion produced by its being attached to the X-slide 8. The tool holder and changer head 20, in the following "tool holder", will be described in detail further below.

Below the gantry-like positioner 4 there is seen a rectangular working table 22 in the form of a rigid, relatively heavy steel plate with two plane, parallel, well-machined surfaces. This working table is exchangeable, as may be necessary for different categories of work, and the reproducibility of its position in space is ensured in the horizontal plane by three points in the form of three projections 24 defining a triangle, against which projections the table 22 is pressed by toggle clamps 26. As to location and orientation, the table 22 is defined by a corner 28, integral with the frame 2, against four projections 30 of which corner the table 22 is pressed with the aid of a toggle plunger 32.

Further seen is a tool tray 34 riding on rails 36 mounted on an auxiliary frame 38 attached to the main frame 2. The tool tray 34, driven by a cable cylinder 40, can assume two well-defined positions: the one shown in FIGS. 1 and 2, in which the tray 40 is within the working area and above the working table 22, presenting a number of tools $T_2$, $T_3$ ... for pickup (Tool $T_1$, in a procedure to be explained further below, has already been picked up and is held in the tool holder 20 of FIG. 3. What is seen in its place after pickup is a cylindrical boss 42 which serves as locator for the tool, the base of which has a shallow cylindrical recess slidingly fitting the boss 42).

The other position of the tool tray 34 is the position of complete withdrawal (not shown), in which the tray has vacated the space above the working table 22, having been pulled back by the cable cylinder 40 as far as it will go.

On the other side of the main frame 2 there are seen a similar auxiliary frame 38, rails 36 and cable cylinder 40 which serve a fixture tray 44 on which are located a number of fixtures $F_1$, $F_2$... The tray 44 is here shown in the withdrawn position. The structure of the fixtures and their operation will be explained further below.

Also seen is a computer 43 for the writing, modifying and running of programs. Interfaces for the various peripherals are located in the cabinets 45.

For a better understanding of the tool holder 20, it is advantageous to first explain the general shape of the tool shank 46, that is, of the component that, in a manner to be described further below, carries and otherwise serves the tool to be used by the unit at any particular instant.

Figure 3:
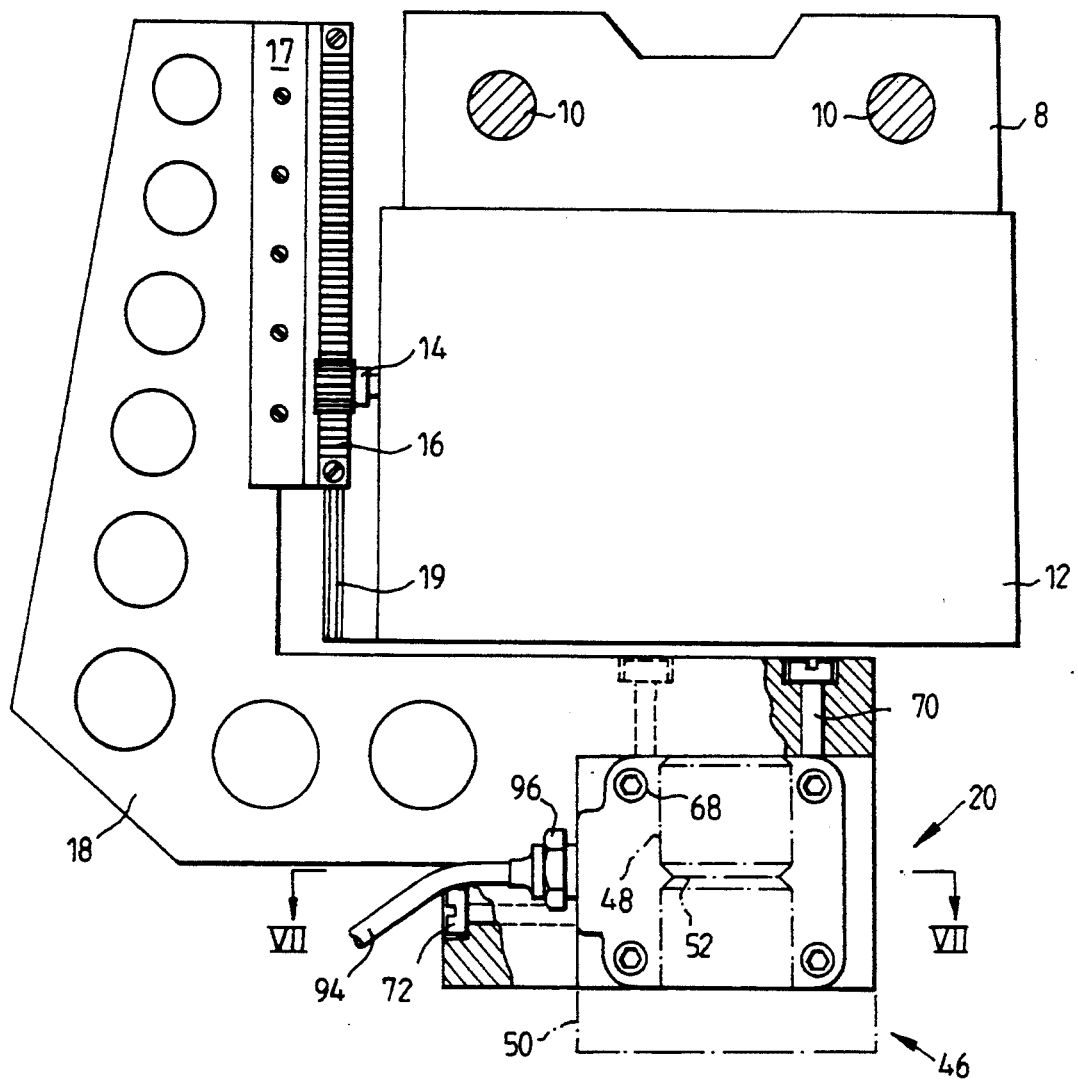
FIG. 3 represents the cantilever arm carrying the tool holder and changer.

In FIG. 3 the tool shank 46, indicated by dash-dotted lines, is seen to consist of the shank body 48 and the flange 50 which abuts the tool holder 20. Also seen is a V-shaped groove 52 surrounding at least part of the shank body 48.

Figure 5:
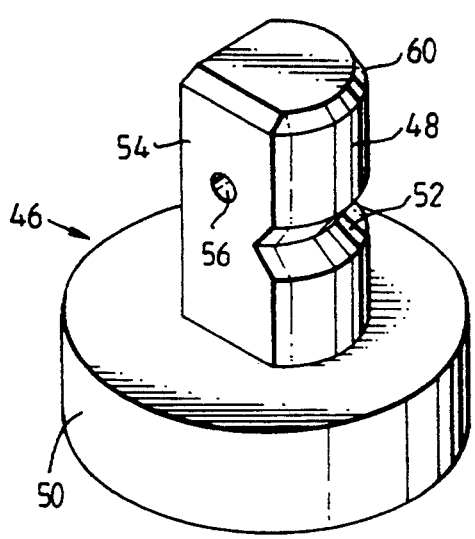
FIG. 5 is a perspective view of the tool shank of the unit according to the invention.

From the perspective view of FIG. 5, it can be seen that the shank body 48 is provided with two plane, axially extending surfaces 54, including with one another a defined angle, in this case 90°. Further seen is one of two holes 56 (the second hole 56 can be seen in the radial cross-section of FIG. 6) which lead into axial bores 58 that pass right through the flange 50. The axes of the holes 56 need not be co-planar as in FIG. 6 and there may be more than one hole 56 to each of the plane surfaces 54, being located one above or beside the other. Plastic or metal tubing may be connected to the bores 58 where they emerge from the lower face of the flange 50, to be led to the tool employed, e.g., a compressed-air-powered milling or grinding head (see FIG. 12).

The upper end of the shank body 48 is provided with a substantial chamfer 60 to facilitate introduction into the tool holder 20.

Figure 4:
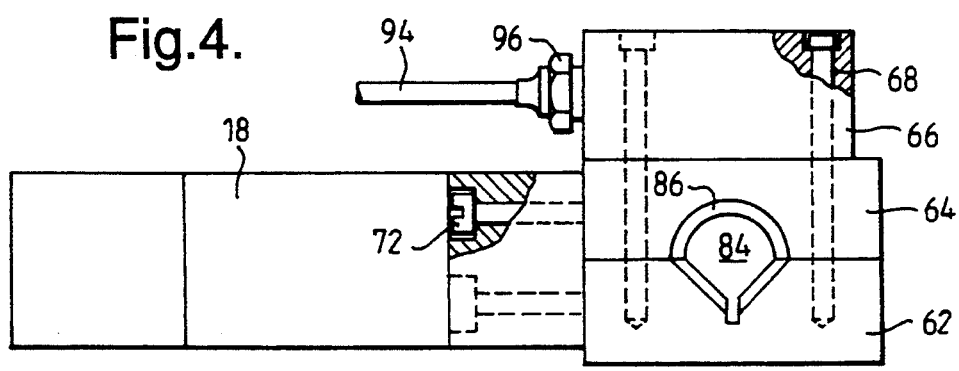
FIG. 4 is a bottom view of the arm and tool holder of FIG. 3.
Figure 7:
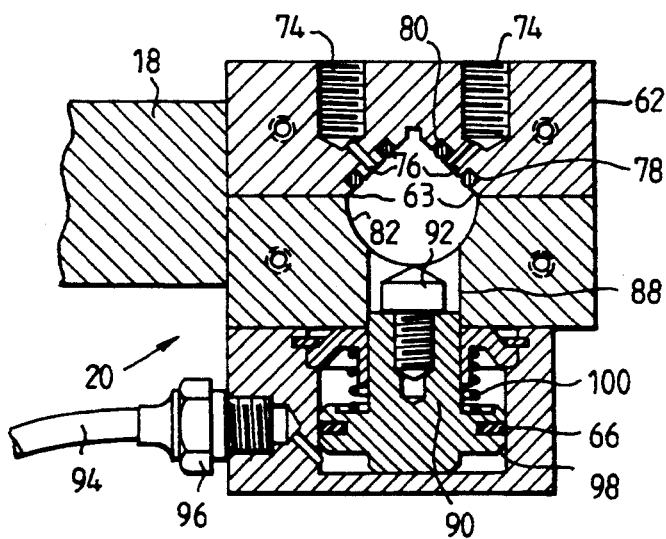
FIG. 7 is a view, in cross-section along plane VII—VII, of the tool holder of FIG. 3.

The tool holder unit 20 is seen in FIGS. 3, 4 and 7 and, in this embodiment, is comprised of three parts: a split tool shank housing having two portions, 62 and 64, and a pneumatic actuator 66. These three parts 62, 64, 66 are clamped together by four screws 68 and are fixedly attached to the cantilever arm 18 by four screws 70 on top, and two screws 72 on the side.

The tool holder part 62 has a V-block-like cross-section, the two plane surfaces 63 forming the V including a defined angle, in this case, 90°. Also seen are threaded bores 74, through which, via holes 76, various fluids (gases such as air, inert gases for welding, or liquids such as coolants, etc., but also vacuum) can be introduced into the above-described tool shank 46, thence to be supplied to the tool carried by the tool shank. Annular grooves 78 surrounding the holes 76 serve to accommodate O-rings 80 which ensure a hermetically tight, leak-proof transfer of the fluid from the holes 76 in the tool holder V-block 62 into the holes 56 in the tool shank body 48. When the tool shank 46 is held in the tool holder 20, the associated holes 76 and 56 must obviously be in substantial alignment.

The tool holder part 64 (FIG. 7) has a trough-like, semi-cylindrical recess 82 of a radius substantially identical to the radius of the cylindrical half of the shank body 48. When the two tool holder parts 62 and 64 are assembled, the opening 84 produced (FIG. 4) is an easy fit to the shank body 48. Also seen in FIG. 4 is a relatively large chamfer 86 on the underside of the tool holder 46 which, together with the chamfer 60 on the upper end of the shank body 48, facilitates the introduction of the shank body 48 into the tool holder 20.

Figure 8:
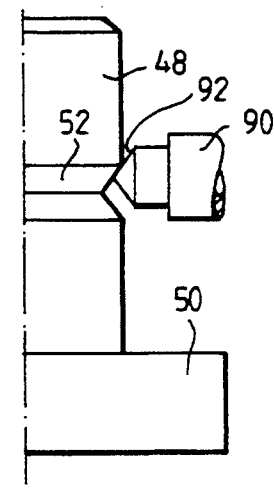
FIG. 8 is a partial view of the actuator tip acting on the shank body.

Further seen in FIG. 7 is a cylindrical bore 88 in the tool holder part 64, which provides access to the piston rod 90 of the pneumatic actuator 66. The rod 90 is provided with a conical tip 92 of an angle identical to that of the shank groove 52. After the shank body 48 is introduced into the tool holder 20, compressed air is introduced into the actuator 66 via the tube 94 and the tube connector 96. The air moves the piston 98, forcing the tip 92 into the groove 52 and thereby pressing the two plane surfaces 54 of the shank body 48 into the V-notch formed by the two plane surfaces 63, thus fully and reproducibly defining the orientation of the tool shank body 48. Accuracy of the Z-position of the shank is obtained by the simple expedient, illustrated in FIG. 8, of having the tip pressure apply slightly above the center of the groove 52. This produces a force component that pulls the shank 46 upwards, until the upper surface of the flange 50 makes firm contact with the underside of the tool holder 20 (see FIG. 3). For release of the shank 46, the compressed air is cut off, enabling the restoring spring 100 to withdraw the piston 98 together with the tip 92, thus effecting release.

Figure 6:
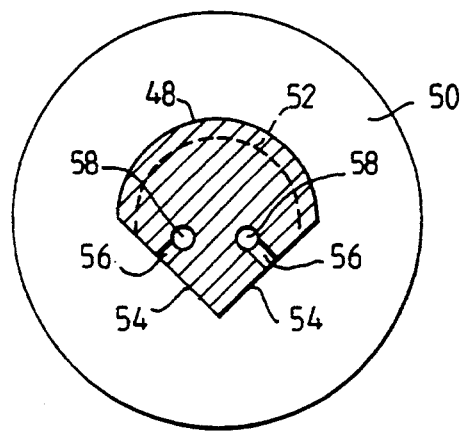
FIG. 6 is a cross-sectional view of the tool shank.
Figure 9:
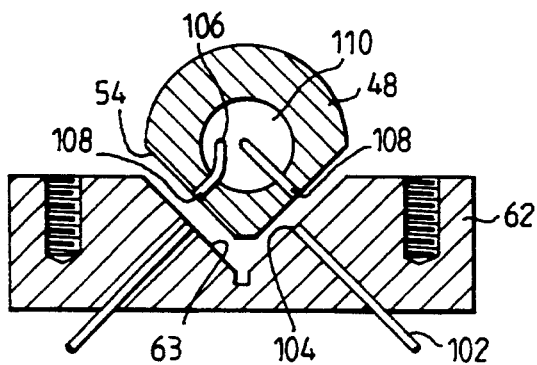
FIG. 9 illustrates an optical interface arrangement between tool shank and tool holder.

While the interface arrangements illustrated in FIGS. 5–7 relate to the transfer of fluids or vacuum, other media, too, can be transferred from tool holder to tool or, for that matter, from tool to tool holder (to be passed on to the computer, as in case of certain sensor information received at the tool side of the setup). Such media would be light in its various wavelengths (IR, visible, UV, laser—continuous or pulsed). FIG. 9, showing the V-notch portion 62 of the tool holder 20 and the shank body 48, illustrates the application of optical fibers. Seen are two fiber bundles (or single fibers) 102, the polished end faces 104 of which are co-planar with the plane surfaces 63 of the V-notch. Another two bundles 106 are attached to the tool shank body 48, with their polished end faces 108 co-planar with the plane surfaces 54 of the shank body 48. The bundles 106 pass along a bore 110 in the shank. When the shank 48 is clamped and pressed against the V-notch, the end faces of the two bundles 102 and 104 are optically coupled. As with the fluid-media interfaces, here, too, there obviously may be only one pair 102/104 to be coupled, or more than the two pairs shown in FIG. 9.

Figure 10:
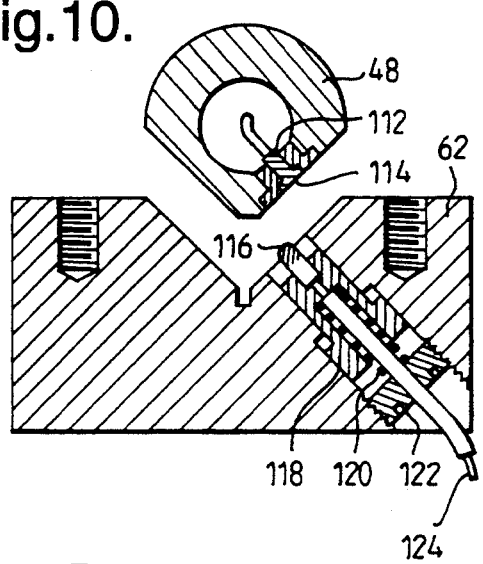
FIG. 10 represents an electrical interface arrangement between tool shank and tool holder.

An electrical interface is shown in FIG. 10. The shank body 48 accommodates a metal contact 112, insulated with respect to the body and having a contact face 114 flush with the plane surface 54 of the shank 48. A domed counter contact 116 is fixedly mounted in a movable insulative sleeve 118 accommodated in the tool holder part 62 and is pressed forward by a helical spring 120 abutting against a screw-in plug 122 with a central hole through which passes the insulated wire lead 124. When the shank 48 is pressed against the V-notch, the contact 116 is depressed, the required pressure for a reliable electrical contact being supplied by the spring 120.

An operational sequence of the unit according to the invention is illustrated in FIG. 11a–m. The components seen to participate and marked in stage (a) include the tool holder unit 20 and the cantilever arm 18 on which it is mounted, the working surface 22, the tool tray 34 and two tools T₁ and T₂ with their shanks 48.

In stage (a), the tool holder 20, carrying as yet no tool, moves upwards and, subsequently, leftward, and the tool tray 34 moves into the working space above the surface 22.

In stage (b), these two coordinated movements have been completed, with the tool holder 20 being situated above the shank 48 of the tool T₁.

In stage (c), the tool holder 20 has descended upon, and gripped, the shank 48 of T₁ and, in stage (d), lifts the tool T₁ off its locating boss 42.

In stage (e) the tool tray 34 has withdrawn to its position of rest and the tool holder 20 has descended towards the working surface, where the actual work, say, drilling or milling, now takes place.

Stage (f) shows the lifting of the tool holder 20 and tool T₁, after completion of the operation of the latter.

In stage (g), the now elevated tool holder 20 and the tool tray 34 have moved toward one another and in stage (h) the tool holder 20 descends towards the tool tray 34 and, releasing the tool T₁, deposits it onto the locating boss 42.

In stage (i), the tool holder 20 ascends again and, having moved to the left in stage (j), descends upon, and grips, tool T₂ in stage (k).

Stages (l) and (m) are repetition of stages (d) and (e), with the use of tool T₂.

Figure 12:
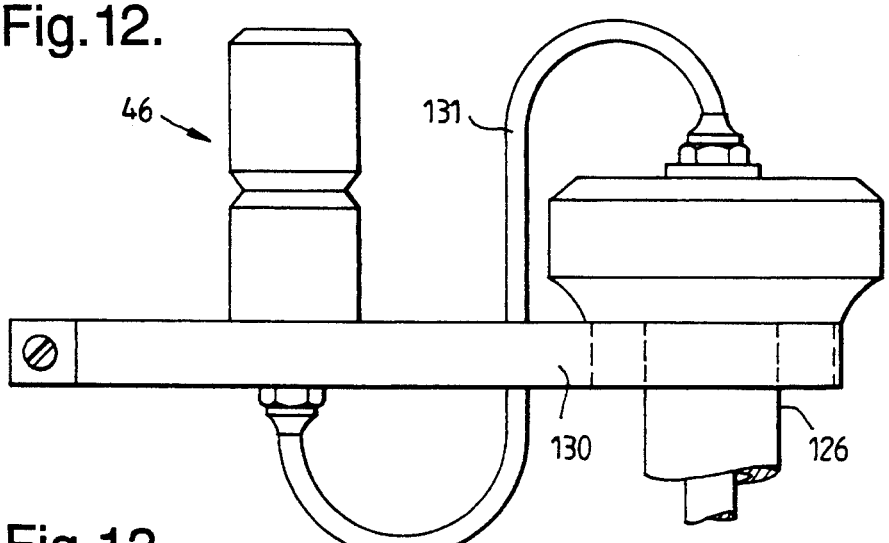
FIG. 12 is an elevational view of the mechanical connection between a tool shank and the tool carried by it.
Figure 13:
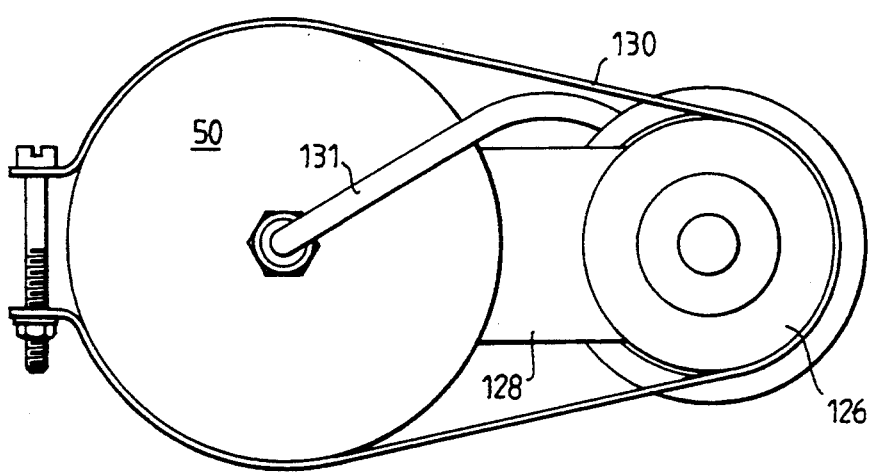
FIG. 13 is a bottom view of the arrangement of FIG. 12.
Figure 11A:
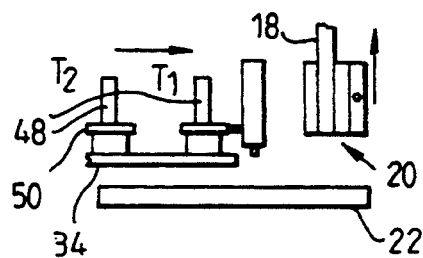
FIG. 11 is a breakdown, into separate stages, of an operational sequence of the unit according to the invention.
Figure 11B:
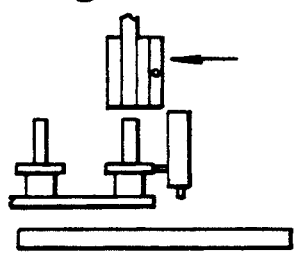
Figure 11C:
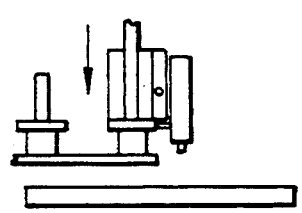
Figure 11D:
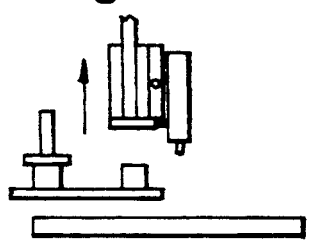
Figure 11E:
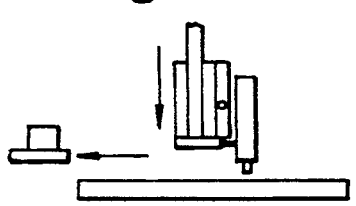
Figure 11F:
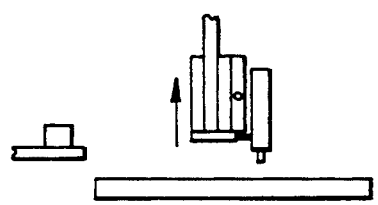
Figure 11G:
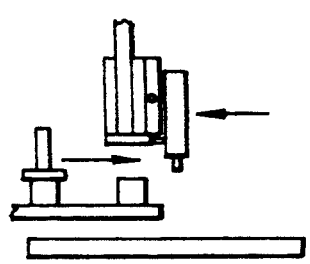
Figure 11H:
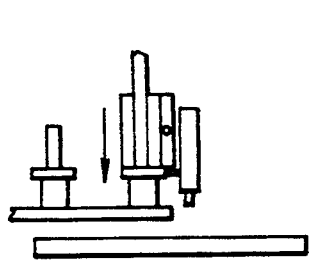
Figure 11I:
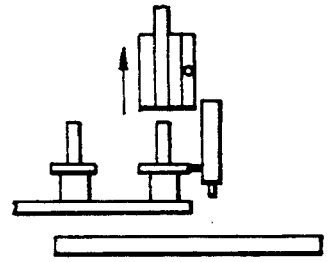
Figure 11J:
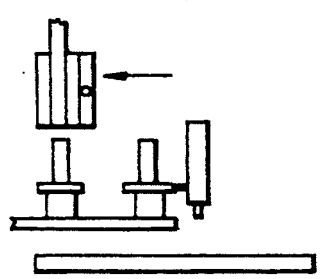
Figure 11K:
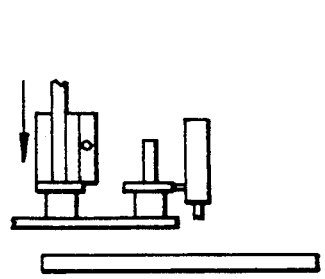
Figure 11L:
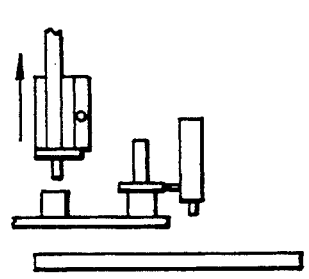
Figure 11M:
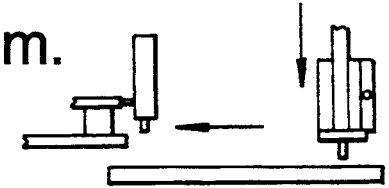

The connection between the tool shank unit 46 and a tool carried and served by the latter is illustrated by FIGS. 12 and 13. The tool is, e.g., a pneumatic grinding or milling tool requiring a supply of compressed air. It has a cylindrical mounting portion or sleeve 126 which, via an intermediate piece 128 with concave lateral faces that fit, on one side, the shank flange 50 and on the other, the mounting portion 126, is pressed and, thus, held against the flange 50 with the aid of a band clamp 130 of the known and commercially available type. Compressed air is supplied by a plastic tube 131 connected to the tool holder interface arrangement illustrated in FIGS. 5 to 7.

While the band clamp 130 affords a simple and reliable way of mechanically connecting a tool to the tool shank 46, it is of course possible to make the flange 50, the intermediate piece 128 and the sleeve 126 an integral whole, attaching a tool shank body 48 at the appropriate spot and dispensing with the band clamp 130.

Figure 14:
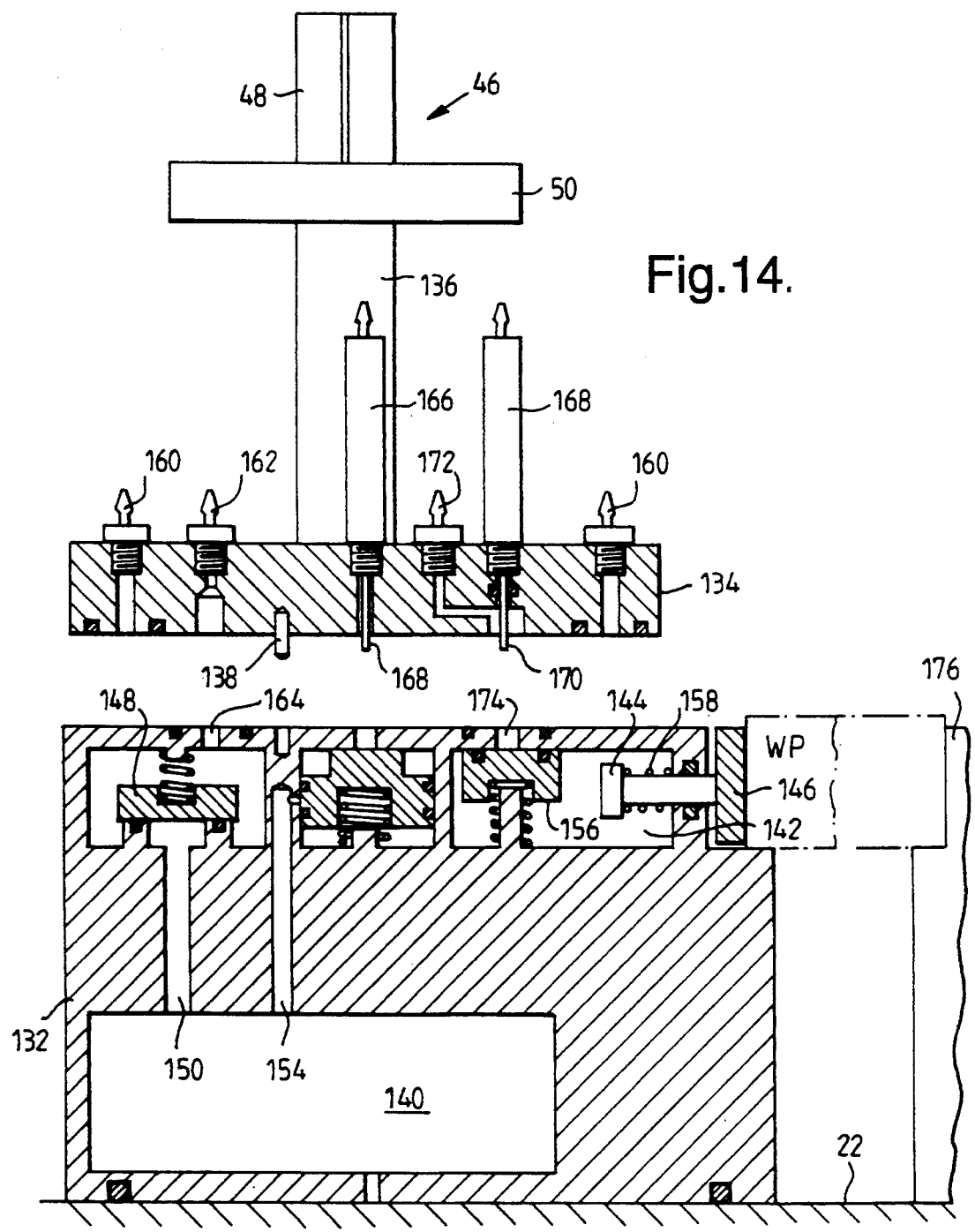
FIG. 14 is a cross-sectional view of an universal fixturing system according to the invention.

FIG. 14 represents a fixturing system flexible enough to be used for a great variety of workpieces, thus substantially reducing the cost of short-run production, of which the preparation and handling of special fixtures is often a significant part.

The fixture is seen to consist of a body block 132 and a handling block 134 attached by means of a stem 136 to a tool shank 46 and, when the fixture is not used, seated on the body block 132, its position relative thereto being defined by two locator pins 138 (of which only one is shown).

The body block 132 is provided with a first, relatively large chamber 140 which serves as a reservoir for the vacuum required to firmly attach the block 132 to the working surface 22, and a second, much smaller chamber 142 for compressed air which, acting on the plunger 144, moves the clamping jaw 146, thus clamping the workpiece WP. Further provided are three spring-loaded, normally closed valves: a first valve 148 closing off a duct 150 through which the chamber 140 is evacuated; a second valve 152, of the spool type which, when depressed, connects the chamber 140 with the atmosphere via a duct 154, thus releasing the vacuum, and a third valve 156 closing off the compressed-air chamber 142. When this valve is depressed, the compressed air escapes, permitting the restoring spring 158 to retract the plunger 144, thus releasing the workpiece WP. All seals are of the O-ring type.

The handling block 134 comprises two nipples 160 to apply a vacuum for lifting the body block 132 with the aid of the tool holder 20 (not shown); a nipple 162 to apply a vacuum through the orifice 164 to evacuate the chamber 140; a first pneumatic cylinder 166 with a piston rod 168 for depressing the valve 152; a second pneumatic cylinder 168 with a piston rod 170 for depressing the valve 156, and a nipple 172 for supplying compressed air to the chamber 142 through the orifice 174. The stationary jaw 176 is either part of a similar block to be separately attached to the working surface 22 or, particularly for relatively short workpieces WP, part of a bracket attachable to the lateral wall of the body block 132.

The various requirmeents for vacuum and compressed air could also be met through the above-discussed fluid-interface arrangements.

In operation, the fixture according to the invention works as follows:

The body block 132 is mounted on the fixture tray 44, with the handling block 134 seated on it. After the fixture tray 44 has moved into the working space, the tool holder 20 descends upon, and grips, the tool shank 46 of the handling block 134. The lifting vacuum is now applied to the nipples 160, the tool holder 20 lifts the handling block 134, including the now vacuum-attached body block 132, off the tray 44 which is now partly retracted. The body block 132 is now set down on the working surface 22 at a predetermined location and firmly attached thereto by evacuating chamber 140. The lifting vacuum is released and the handling block 134 lifted off the body block 132, returned to the tray 44 and released. The tray 44 then moves to its position of rest. The tool holder 20 now acquires a tool (see FIG. 11a–d), a workpiece WP is loaded, using any of the known, commercially available loading and unloading devices (not shown) and machining (or whatever other operation) is carried out, possibly also involving change of tools. Eventually, clamping pressure is released, either by recalling the handling block 134 and actuating the cylinder 168, or by using a suitably modified loading and unloading device which is equipped with a mechanism capable of depressing the valve 156 and, after unloading the finished workpiece WP and loading a new workpiece, reapplying pressure in the chamber 142 and thus clamping the workpiece.

The clamping element such as the moving jaw 146 may take different shapes for different types of workpieces. Thus it may be in the form of a V-block, oriented horizontally or vertically, for the handling of round work pieces, or an arrangement for the internal chucking of hollow workpieces, etc.

While the present design of a female tool holder 20 matching the male tool shank 46 was seen to be most reliable and efficient, it would also be possible to reverse the situation and to have a male tool holder as permanent part of the unit, fitting hollow, female-type tool shanks with the V-profile. These male tool holders would be equipped with an internally mounted pneumatic piston that effects inside-to-outside clamping.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A robotic manufacturing unit with automatic tool changer, comprising:
   a stand defining a working space and accommodating a rigid, substantially plane working surface;
   means, supported by said stand above said working surface, and having an output member adapted to controllably move in three-dimensional space;
   a tool-holding and changing member attached to said output member and adapted to clampingly retain shanks of carriers of tools, said tool-holding and changing member having an internal recess having a V-block-like cross-section produced by two plane surfaces including a defined angle, said tool shanks having two longitudinally extending plane surfaces including an angle substantially identical with said defined angle of said V-block-like cross-section;
   a tool tray adapted to accommodate a plurality of tools mounted on tool carriers and, in coordination with said tool holding and changing member, to move along guide means from a position of rest, in which said tray is located outside of said working space, to a position of tool pickup and return, in which said tray is substantially located within said working space and above said working surface;
   whereby upon tool pick-up by said tool-holding and changing member, said member moves down upon and over said tool shank, means being provided to press the two plane surfaces of said tool shank against the two plane surfaces of said V-block-like cross-section, thereby ensuring said unique and reproducible definition of said relative angular positions, and wherein the relative axial positions of said tool-holding and changing member and said shanks are ensured by flange means.

2. A fixturing system for use with a robotic manufacturing unit having a stand defining a working space and accommodating a rigid, substantially plane working surface; means, supported by said stand above said working surface, and having an output member adapted to controllably move in three-dimensional space; a tool-holding and changing member attached to said output member and adapted to clampingly retain shanks of carriers of tools; and a tool tray adapted to accommodate a plurality of tools mounted on tool carriers and, in coordination with said tool holding and changing member, to move along guide means from a position of rest, in which said tray is located outside of said working space, to a position of tool pickup and return, in which said tray is substantially located within said working space and above said working surface; wherein said tool-holding and changing member and said shanks fit into one another and have non-circular cross-sections uniquely and reproducibly defining, when said shanks are clampingly retained, the relative angular positions of said tool-holding and changing member and said shanks; said fixturing system comprising:
   a body block attachable to said working surface by vacuum suction and incorporating a vacuum chamber to provide a vacuum reservoir for said vacuum suction and a compressed-air chamber for actuating spring-loaded plunger means to provide a clamping force acting on a clamping jaw;
   first normally closed valve means to retain the vacuum in said vacuum reservoir once attained;
   second normally closed valve means to release said vacuum for detaching said body block from said working surface;
   third normally closed valve means for retaining said compressed air in said compressed-air chamber once introduced thereinto for producing said clamping force and for releasing said compressed air for eliminating said clamping force;
   a handling block having shank means adapted to be held by said tool-holding and changing member;
   first vacuum connectors to temporarily attach said body block to said handling block by vacuum suction;
   second vacuum connectors to evacuate said vacuum chamber;
   a compressed-air connector for supplying said compressed-air chamber;
   first actuator means to open normally closed second valve means; and
   second actuator means to open said normally closed third valve means;
   wherein said body block is located on said fixture tray and can be moved therefrom to be placed onto said working surface by the use, in conjunction with said tool-holding changing member, of said handling block.

3. The manufacturing unit as claimed in claim 1, wherein said means is an XY positioner to the slide of which has been attached an angular-position-controllable motor linked via rack-and-pinion means to said output member and producing in same a translatory movement in the Z-axis direction, and wherein said output member is an arm carrying said tool-holding and changing member.

4. The manufacturing unit as claimed in claim 1, further comprising a fixture tray adapted to accommodate at least one fixture for holding workpieces during the manufacturing process and, in coordination with said tool holding and changing member, to guidedly move from a position of rest, in which said tray is located outside of said working area, to a position of fixture pick-up and return, in which said tray is substantially located within said working area and above said working surface.

5. The manufacturing unit claimed in claim 1, wherein said tool shank is provided on at least one of said plane surfaces with at least one aperture constituting the inlet of a duct leading via said tool shank to said flange means, and said tool-holding and changing member is provided on at least one of said plane surfaces with at least one aperture constituting the outlet of a duct coming from the outside of said tool-holding and changing member, and wherein, in assembly of said tool shank and said tool-holding and changing member, said inlet and outlet apertures are substantially aligned.

* * * * *